May 2, 1944.  W. B. BOICE ET AL  2,347,765
BAND SAW
Filed July 11, 1941   5 Sheets-Sheet 1
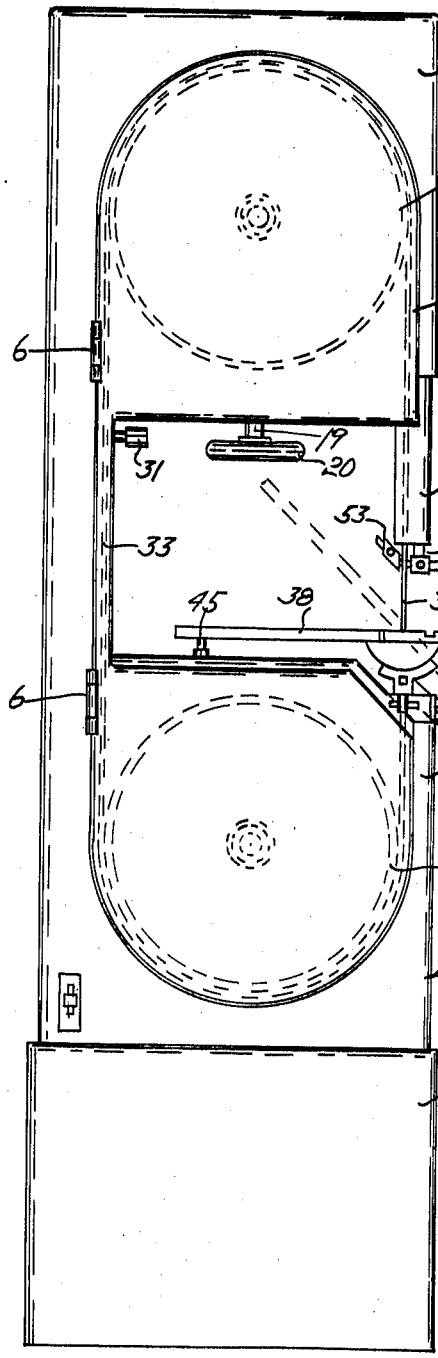
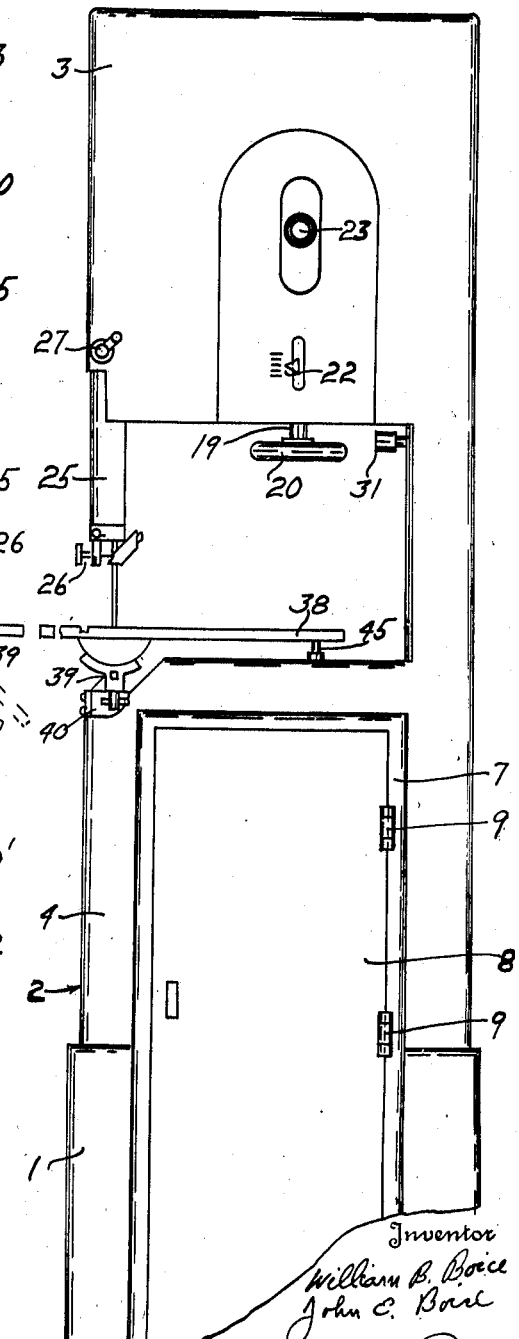
Inventor
William B. Boice
John C. Boice
Alfred F. Gees
By
Attorney

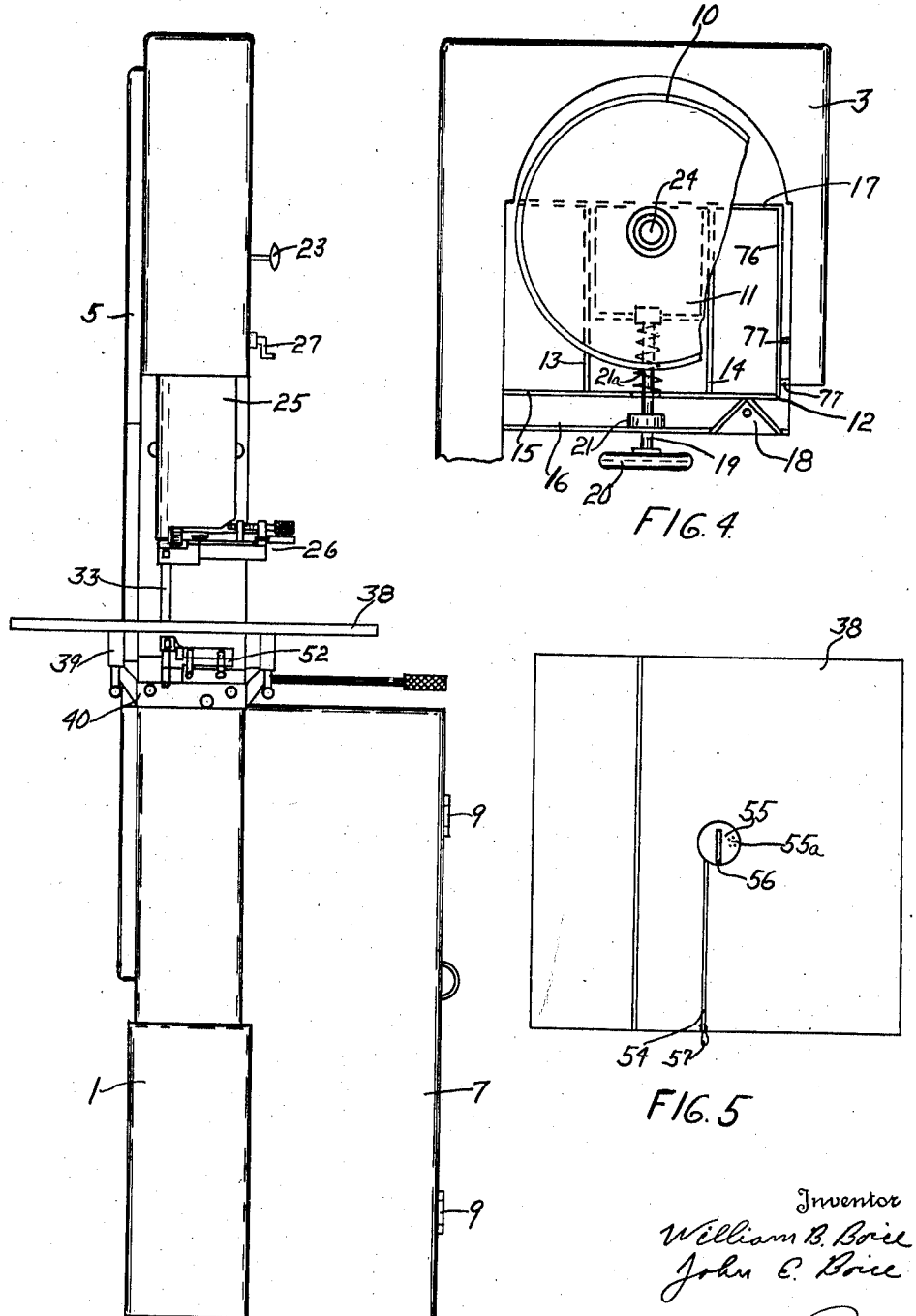

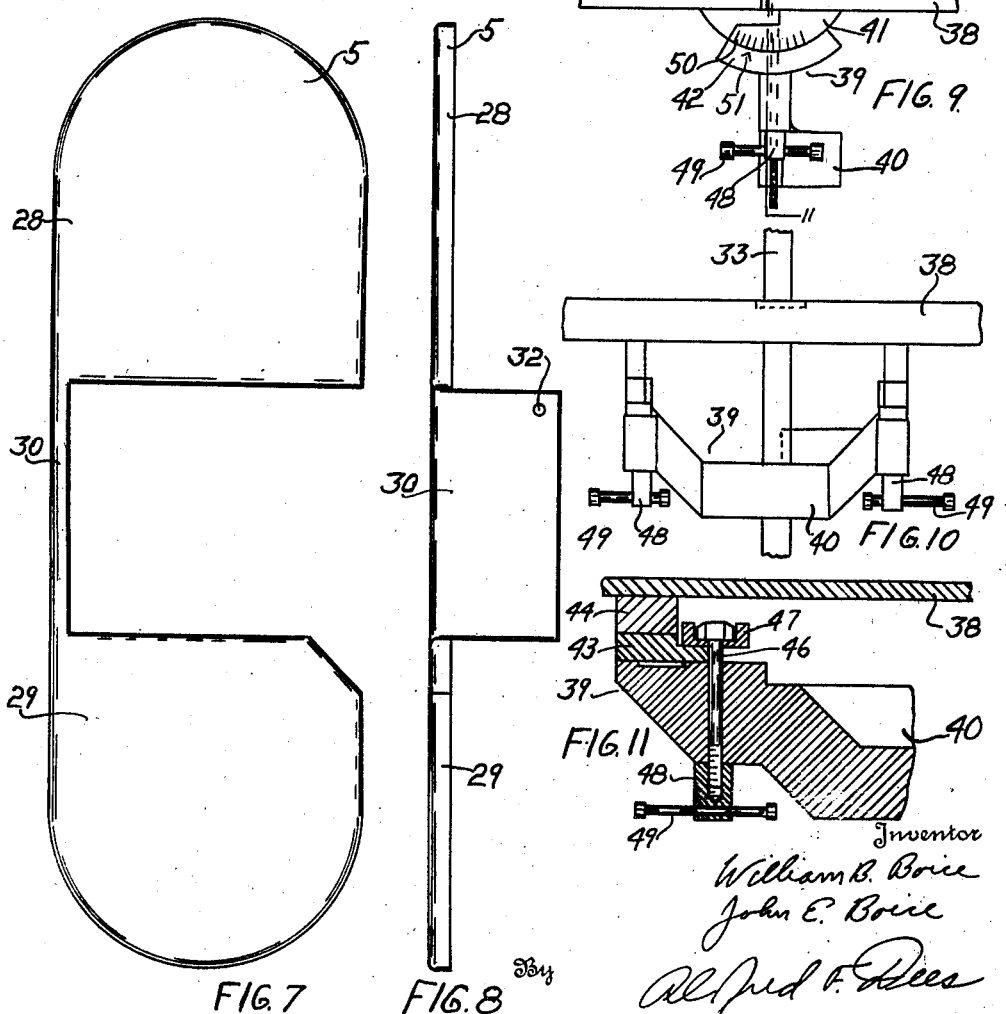

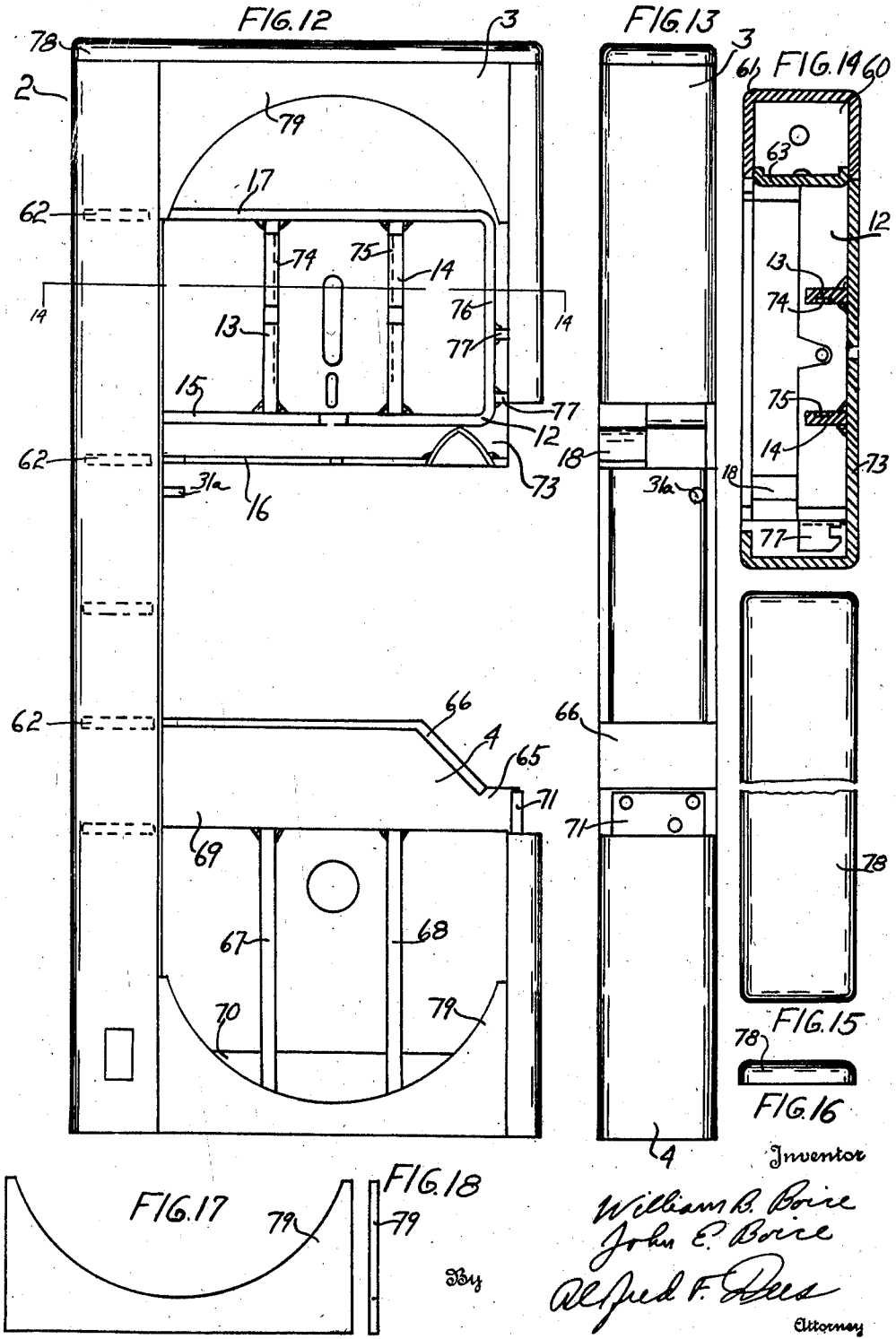

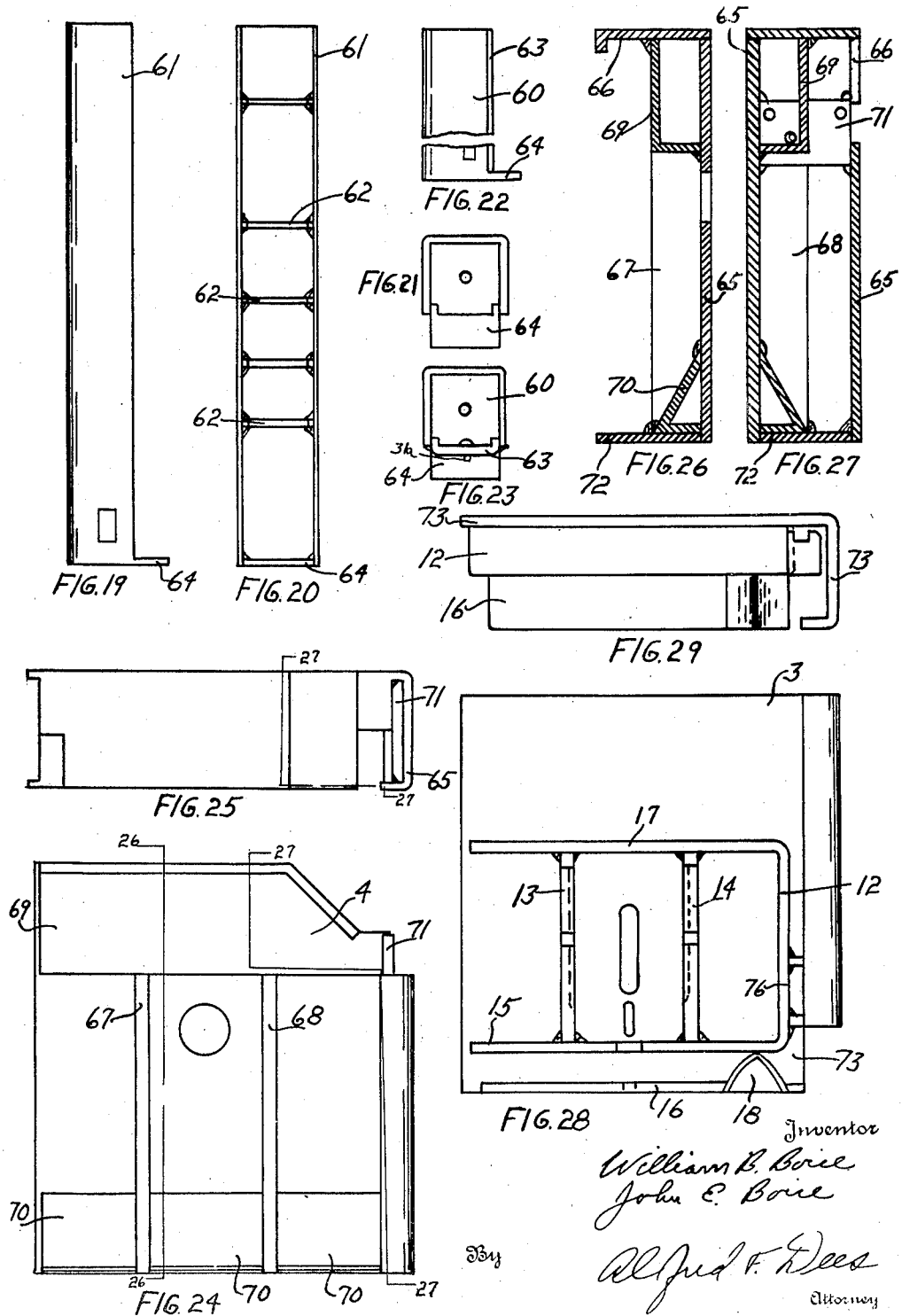

Patented May 2, 1944

2,347,765

UNITED STATES PATENT OFFICE 2,347,765

BAND SAW

William B. Boice and John E. Boice,
Toledo, Ohio

Application July 11, 1941, Serial No. 402,014

3 Claims. (Cl. 143—17)

This invention relates to band saws and in its more specific aspects relates to an improved saw guard and saw frame arrangement, drive and table arrangement each of which parts separately and in combination produce a more efficient and effective combination of the several parts. One object of the invention is to produce a saw guard structure that completely guards the entire saw and only leaves that portion of the saw exposed which actually is used to perform a cutting operation.

Another object of the invention is to produce a saw guard one portion of which is a door that guards the band saw wheels and having another portion that protects the saw between the two wheels, and which may be readily swung aside to make the saw fully accessible.

Another object of the invention is to construct a saw guard in the form of a door swingable on the frame of the machine and which comprises three sections each of which is adapted to cover different parts of the machine and the saw.

A still further object of the invention is to provide a multi-section saw guard that completely covers the saw and having a portion adjustable to bring the guard immediately above the work irrespective of the position of the table or the thickness of the work piece.

Another and further object of the invention is to provide a combination guard, guide and table construction that reduces the number of parts required, reduces the cost of manufacture and produces a more compact and easily adjusted mechanism.

A still further object of the invention is to provide means to indicate the tension in the saw and to prevent the breaking of the saw and to provide a positive slip free condition of the saw.

Another and further object of the invention is to construct a head for a band saw which utilizes standard steel mill products and avoids the necessity of extensive machining and casting operations.

A still further object of the invention is to construct a band saw head which uses a combination of bar and sheet metal products each of which is pre-fabricated into sub-assemblies before final assembly into the resultant head.

Another object of the invention is to construct a band saw head which uses standard sheet metal products and in which bar and other stock requiring machining is machined before fabrication into a sub-assembly or the final band saw head.

A still further object of the invention is to fabricate a band saw head from steel shapes each of which has had its necessary parts machined and formed before final assembly and welding to form the band saw head.

Other and still further objects of the invention are to increase the rate of cutting causing a maximum of the power consumed to be used in driving the saw and not consuming it in friction in the parts by eliminating the weight in the driving parts, providing mechanism to make certain that the saw is in proper tension, to provide for quick removal and installation of the saw in the machine and to provide a maximum safety for the operator while performing work on the machine.

Other and further objects of the invention will occur to those skilled in the arts to which this invention pertains as the description proceeds which taken in connection with the accompanying drawings sets forth a preferred embodiment of the invention but such disclosure is not to be construed as a limitation of the invention which is limited only by the appended claims and any and all modifications, alterations and variations of construction coming within the spirit and scope thereof are deemed to be included herein.

In the drawings:

Figure 1 shows an elevational view of one or the operator's side of the machine.

Figure 2 shows an elevational view looking at the opposite side of the machine.

Figure 3 shows an elevational view of the right hand side of the machine.

Figure 4 shows a detail view of the head of the machine with the cover guard removed and one part broken away to show details of construction.

Figure 5 shows a plan view of the table.

Figure 6 shows a section view of one of the band saw pulley wheels.

Figure 7 shows a front view of the guard door.

Figure 8 shows an edge view of the guard door.

Figure 9 shows an end elevational view of the trunnion that rotatably supports the table on the band saw head.

Figure 10 shows a side elevational view thereof.

Figure 11 shows a section view of the trunnion taken along the line 11—11 of Figure 9.

Figure 12 shows a front elevational view of the columnar band saw head.

Figure 13 shows a side elevational view thereof.

Figure 14 is a section view taken along line 14—14 of Figure 12.

Figure 15 is a plan view of the cover portion of the columnar band saw head.

Figure 16 is an end elevational view thereof.

Figure 17 is a front elevational view of a detail of the band saw head.

Figure 18 is an end elevational view thereof.

Figure 19 is a front elevational view of the principal column of the band saw head.

Figure 20 is a side elevational view thereof.

Figure 21 shows a plan view thereof.

Figure 22 shows a front elevational view with the closure member attached to the column of Figure 19.

Figure 23 shows a plan view of the structure of Figure 22.

Figure 24 shows a front elevational view of the lower sub-assembly of the band saw head.

Figure 25 shows a plan view of the structure of Figure 24.

Figure 26 is a section view taken along the line 26—26 of Figure 24.

Figure 27 is a section view taken along the line 27—27 of Figures 24 and 25.

Figure 28 is an elevational view of the upper sub-assembly of the band saw head.

Figure 29 is a plan view of the structure of Figure 28.

The machine embodying the above objects comprises a base 1 on which is supported a column-like band saw head structure 2 comprising an upper sub-assembly 3 and a lower sub-assembly 4 in which a drive pulley 10' shown in dotted lines is supported. Disposed on one side of the band saw head is a door or saw guard 5 that is hinged to the column at 6, 6 by means of conventional hinges as indicated. On the other side of the machine there is a housing 7 equipped with a door 8 hinged to the housing 7 by hinge means 9, 9. The housing 7 supports and houses a prime mover and a speed changer both of which are of a conventional character and therefore not illustrated or detailed. The door 8 has appropriate latch means to keep it closed and make access to the prime mover and speed changer described possible at the election of the operator and with comparative ease.

The band saw head has supported therein a pulley or wheel 10 that is rotatably mounted in an appropriate bearing housing 11 slidably mounted in a frame 12 that is fabricated from bar stock and which includes a pair of columns 13 and 14 supported in a U shaped member between portions 15 and 17. The portion 76 parallel to 13 and 14 constitutes the base of the U element 12. At one point or portion in proximity to the point at which the saw 33 passes, a light receptacle 18 is secured to a portion of the element 16, in which a convenient and appropriate illuminating means is arranged. The receptacle 18 is shown as triangular but for better lighting effects its shape may be made parabolic in order that the light generated may be more effectively projected upon a work piece. A screw 19 having a hand wheel 20 is threadably associated in bearing housing 11 and has its opposite end appropriately secured and rotatably in the collar 21 whereby to raise and lower the housing 11 and the pulley wheel 10. A spring 21a is concentrically disposed on screw element 19 and acts to tension the band saw blade 33.

Hand wheel 20 upon rotation will vertically adjust wheel 10 and tension a band saw mounted thereon. 22 indicates a tension gage that informs the operator of the relative tension existing in the band saw 33 and 23 indicates the operating end of a conventional tilting means that is adapted to tilt shaft 24 with respect to the housing 11.

Slidably mounted in the sub-assembly 3 is a vertically adjustable saw guard 25 having mounted on its lower end a saw guide 26 the details of which elements, 25 and 26, are set forth in a companion application Serial Number 396,434, entitled Band saw, filed the 3rd day of June, 1941. A locking means 27 is provided in band saw head 3 that is adapted to lock guard 25 in any vertically adjusted position the details of which element are more specifically set forth in the above identified application.

The cover 5 previously described is more specifically set forth in Figures 7 and 8 and comprises two portions 28 and 29 that enclose or cover upper wheel 10 and a lower or drive wheel (not shown). The hinges, for convenience, are not shown assembled in the cover but are welded therein. Portions 28 and 29 are connected by a third portion 30 that is disposed at right angles to the planes of portions 28 and 29 or in other words the vertical plane of portion 30 is disposed 90° from the aforementioned planes of portions 28 and 29. The portion 30 is adapted to extend over that part of the column 2 that extends between the head 3 and housing 4 and which guards that portion of the saw that passes upward to the wheel 10 from the lower wheel as illustrated by the dotted lines of the saw in Figure 1. A screw 31 having a knurled head serves to lock the cover 5 in a closed position, there being an appropriate stud 31a (Fig. 12) fixed in the column 2 that passes through an aperture 32 arranged in portion 30 of the cover 5.

It is evident from the foregoing that the cover 5 having its angularly disposed portion serves to completely protect the operator on the inactive side of the saw, to prevent any possible contact of the operator with the band saw pulleys and since adjustable guard 25 and its guide 26 can be brought into immediate proximity of the work piece that the band saw 33 is therefore provided with a maximum guard that leaves only that portion of the saw exposed which is actually operating on a work piece. The above identified application more completely sets forth the co-operation of the guard 25 and guide 26 in relation to the work piece.

A table 38 is pivotally mounted on housing 4 by means of trunnions 39. The trunnions are supported on bracket 40 rigidly secured to the sub-assembly 4 and the other part of the trunnion is secured to and integrally associated with the table 38. The trunnions comprise two portions 41 and 42, the former of which is fabricated in the form of a segment of a circle comprising a wear plate 43 which is removably secured to a boss 44 that is made a part of the table 38. Wear plate 43 is secured to boss 44 by means of a plurality of screws (not shown) or it may be welded thereto if so desired. The bracket 40 comprises an appropriately shaped bar element that has the portion 42 which is complemental to the portion 41 and its wear plate 43 and the latter rotates on an axis that lies in the upper plane or work supporting surface of the table 38. The portion 42 is made of such a size in the form of a segment of a circle such as to permit a 45° tilting of the work table. A stop mechanism or button 45 (Figs. 1 and 2) may be provided on top of the base 4 to support the table in a horizontal position.

Means have been provided to lock the table 38 in any angularly adjusted position which comprises a locking screw 46 the head of which is non-rotatably received in a counter-bored washer 47 that in turn rests upon a flange integrally associated with the wear plate 43. The flange is extended to the immediate proximity of screw 46 disposed in an appropriate aperture formed in or near the extreme ends of the bracket 40. A nut 48 having a handle 49 therethrough is threaded to or on screw 46 and is adapted to tension screw 46 to thereby clamp wear plate 43 to portion 42 of the bracket 40 in any position to which table 38 may be angularly adjusted. Wear plate 43 has an index 50 arranged thereon that co-operates with the pointer 51 and indicates the degree of tilt of the table with respect to the saw 33.

A lower saw guide 52 (Fig. 3) is disposed immediately below the table and is supported on a portion of bracket 40, the immediate method of mounting the saw guide on the bracket 40 being disclosed in the application above identified. Attention is at this point invited to the fact that guide 52 is inverted from guide 26 and that the portion 53 of saw guide 26 which contains the angularly disposed rigid guide is at 45° to the horizontal and that since the lower saw guide which is identical thereto will have the corresponding element thereof likewise disposed at an angle of 45° to the horizontal and extending in the same direction as portion 53. Since therefore trunnions 39 are disposed and made such that they will permit a 45° tilting of the table 38 and since guard 25 is capable of vertical adjustment so as to bring guide 26 into immediate proximity to a work piece supported on the table it is apparent that with portion 53 and the complemental portion thereof on the lower guide lying in parallel planes that table 38 may be so arranged that it will lie in between the parallel planes just described and afford thereby a complete guarding of the saw in any degree of tilt up to 45° with the same amount of protection as if the table 38 is in a horizontal position. Therefore the construction just described affords a maximum of protection for any degree of table tilt from the horizontal to 45° therefrom indicated by dotted line in Fig. 1 to which position the table may be tilted at the election of the operator.

The table 38 is provided with a saw slot 54 and a plate element 55 which is removably and non-rotatably supported in an appropriate bore centrally disposed of the table 38. See Fig. 5. The plate 55 has a slot 56 therein and is provided with a boss or plug element indicated by dotted line 55a that co-operates with an aperture in table 38 the two portions co-operating to prevent any relative rotation of the plate 55 and the table. Attention is invited to the fact that the planes of slots 56 and 54 are in parallel relation to each other and do not lay in the same line or plane. When it is desired to remove from or insert a band saw into the machine it is necessary to remove plate 55 thereby permitting the removal or insertion of a saw blade whereupon plate 55 is replaced such that it assumes the position indicated. Plug 57 is further provided to keep the two halves of the table 38 parallel at the front edge. Attention is further invited to the fact that the slot 54 is disposed relative to the boss 41 and wear plate 43 such that a bending of the saw around the index element 50, boss 44 and wear plate 43 is necessary to insert the saw and thereby bring the plane of travel of the saw between the trunnions 39 and in which the center of tilt or rotation of the table 38 as determined by the trunnions 39 will lie in the plane of the saw disposed therebetween. See Fig. 9. The several trunnion elements are so proportioned as to permit the saw to be manipulated as described. This construction enables a direct reading of the degree of tilt of the saw with respect to the table and requires no interpolation. The light that is placed in receptacle 18 is focused on the area defined generally by the plate 55 on table 38 and provides the operator with a constant source of illumination for any degree of tilt of the table.

The column like element 2 previously discussed above in connection with the organization of the machine of which the upper and lower sub-assemblies 2 and 3 comprise essential elements originates in a substantially elongated rectangular tubular element 60 which is fabricated from a U shaped element 61 having a plurality of spaced reinforcing elements 62, 62 therein so placed that they take up the strain of the sub-assemblies later mounted thereon. The spacers are so cut that the forward wall 63 preferably in the form of a shallow U shaped structural element may be assembled therein as more particularly shown in Figure 23. The elements 61 and 63 are formed from a fairly heavy sheet stock in a suitable die. In constructing this element the plates or spacers 62, 62 etc. are assembled in an appropriate jig by means of the apertures shown in Figure 21 and Figure 23 and then element 61 is fitted thereover and the several parts welded together. Simultaneously a foot piece 64 is welded into the column 60 which is secured to the base 1 of the machine.

The sub-assemblies 3 and 4 are then secured to the column 60 by welding and these parts which have been previously discussed in a general way will now be explained in greater detail. The lower sub-assembly 4 set forth in Figures 24–27 comprises initially a sheet metal wall portion 65 bent generally into the shape indicated in Figure 25 and has the cover portion 66 welded thereto along the upper edge of wall 65. The structural parts of the sub-assembly 4 for the purpose of imparting rigidity thereto comprise a plurality of vertical bar elements 67 and 68 and two transverse elements 69 and 70 fabricated from sheet stock into the respective right angular and the acute angular form illustrated. These several parts are welded to the wall 65 and the cover portion 66 and thereby forms a rigid wall or sub-assembly preparatory for welding to the column 60 as will be described later. A plate 71 is welded into the U shaped portion formed in the wall 65 to which the bracket 40 for rotatably supporting the table is secured. The plate 71 is assembled into the wall 65 by welding as shown in Figures 24 and 27. The holes are preferably drilled and tapped prior to assembly of the plate 71 in the wall section 65. A plate 72 which lies in the same plane as foot plate 64 is welded into the base of sub-assembly 4 to facilitate the welding of the sub-assembly 4 to the base 1 of the machine. The several elements combine to form a strong, sturdy and what is the equivalent of a solid one-piece base for supporting the work table 38 and associated elements.

Following the above operation the lower insert 79 is then welded into the sub-assembly 4 in the position shown which completes the assembly of that portion of head 1.

The lower sub-assembly 4 has been described as first assembled onto the column 60 before the elements of the sub-assembly 3, cover 78 and insert 79 are secured thereto but in actual practice sub-assembly 4 is secured to column 60 last although the sequence of assembly onto column 60 is optional with the operator. The preferred method of assembling the elements of 3 onto the column 60 is to first take the wall 73 which has been formed into an L shape as shown in Fig. 29 and which is shaped at its lower end to have the portion 16 formed thereon and is then welded to the column 60. This done the cover 73 is welded to the column 60 and to the wall 73 which completes that portion of the head 1. Then the insert 79, shaped as shown in Figs. 17 and 18, is installed by welding it into position as shown in Fig. 12. There may be necessity at times of performing a straightening operation on the parts before proceeding to the next operation but that is deemed a mechanical expedient within the knowledge and judgment of the operator.

The next operation involves the putting in place of element 12 in the sub-assembly 3 and aligning it with the several openings formed in wall 73 and associated parts before welding it to column 60 and wall 73. The element 12 as previously indicated comprises a pair of vertical bars 13 and 14 welded to the horizontal portions 15 and 17 of the U element. The bars 13 and 14 have ways 74 and 75 milled therein in which the bearing housing 11 supporting wheel 10 slides vertically by mechanism previously described. The ways 74 and 75 are milled in the respective bars prior to their assembly into the U element 12. Welded to the leg or base portion 76 of the element 12 are two notched brackets 77, 77 in which the guard 25 slides all as more particularly set forth in the above identified application. There is thus formed a sturdy assembly which will rigidly hold the upper wheel 10 and the bearing housing 11. The parts 15 and 16 are suitably drilled or notched or otherwise machined to receive the adjusting screw and the parts associated therewith. All of the parts are then welded together and the light receptacle 18 secured therein to form a single unitary head structure. The previous welding may be limited to only tacking operations but a complete welding may be done. If only a tacking is done initially then the welding referred to above is performed.

An alternative method of the assembly of sub-assembly 3 onto the column 60 would be to have the frame 12 and its component parts first welded to wall 73 before welding to the column 60 and then welding cover 78 to the top of column 60 and wall 73 whereupon insert 79 would be welded in position as previously described.

Attention is at this point invited to the fact that the element 12 and parts 69 and 70 stop a bit short of the left hand edges of wall portions 65 and 73. This enables the former elements to bear directly against the portion 63 of the column 60 and also enables the walls 65 and 73 to abut one leg of the U shaped portion 61. The several described parts abut each other and thereby permit the several sub-assemblies to be welded together and present a smooth exterior free from projections of any kind after suitable grinding, polishing and buffing operations are performed.

The spacers 62, 62, etc., shown in dotted lines in the column 60 are so placed opposite the several horizontal elements 15, 16, 17 and 69 as to absorb and take up any strain imposed on the columns by the respective sub-assemblies. The entire structure is characterized by extreme strength and yet it has a lightness that enables the operator to easily move the machine from one position to another. All machining operations are performed prior to assembly and therefore obviate a considerable expenditure of machine tool jigs and fixtures. Only a few simple elemental jigs and fixtures for performing the several welding operations are required thereby considerably reducing the time element as well as overhead cost involved in the fabrication of the band saw head.

A compact highly efficient and easily operable machine has just been produced which increases the cutting rate and generally simplifies the installation and servicing of the band saw. That which is considered new, novel and useful and which is sought to be protected by Letters Patent of the United States is as follows:

1. In a band saw head, which comprises; a column fabricated from a plurality of U shaped channel members, having reinforcing elements therein; a lower assembly secured to said column which comprises a wall section and means to reinforce said wall comprising vertically and horizontally disposed members secured to said wall, and means thereon to support a work table; an upper assembly secured to said column which comprises a wall section and a U shaped reinforcing element for said wall section; a cover for said head and a pair of filler plates for said band saw head; said column reinforcing members absorbing the strain of said assemblies.

2. In a unitary band saw head; a reinforced column formed from U shaped sheet metal; a lower assembly secured to said column, said assembly comprising an L shaped wall section and a cover section secured thereto; means to reinforce said wall which comprises a pair of bar members and a pair of transversely disposed triangular sheet metal elements one of which is secured to said cover; an upper assembly secured to said column which comprises an L shaped wall and a reinforced U shaped element to stiffen said wall; a cover for said housing, and means on said lower assembly to support a table bracket.

3. In a band saw head; a column composed of two inter-fitting U shaped elements, having means therein to hold said elements in proper spaced relationship and welded into a unitary structure, said means reinforcing said column; an upper assembly welded to said column, said assembly comprising an L shaped sheet metal wall and means to reinforce said wall, which comprises a U shaped bar element having a pair of bar elements welded therein, said U shaped element and associated parts welded to said wall; a lower assembly welded to said column which comprises an L shaped sheet metal wall having a cover portion welded thereto and means to reinforce said wall comprising a pair of vertically disposed bar members welded to said wall; a right angled reinforcing element transversely disposed to said bar members having one leg secured to said cover and the other to said wall; a base plate in said assembly and an acute angled reinforcing member transversely disposed to said bar members having one face secured to said plate and one leg thereof secured to said wall; and a cover portion for said upper assembly and the upper end of said column, all of said parts welded into a unitary structure.

WM. B. BOICE.
JOHN E. BOICE.